United States Patent
Jeong et al.

(10) Patent No.: US 10,686,200 B2
(45) Date of Patent: Jun. 16, 2020

(54) FRAME GASKET FOR FUEL CELL AND METHOD OF MOLDING THE SAME

(71) Applicant: Hyundai Motor Company, Seoul (KR)

(72) Inventors: Byeong-Heon Jeong, Yongin-si (KR); Seong Il Heo, Yongin-si (KR); Soo Jin Lim, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 330 days.

(21) Appl. No.: 15/363,192

(22) Filed: Nov. 29, 2016

(65) Prior Publication Data

US 2018/0114993 A1  Apr. 26, 2018

(30) Foreign Application Priority Data

May 17, 2016 (KR) .......................... 10-2016-0060449

(51) Int. Cl.
*H01M 8/0273* (2016.01)
*H01M 8/0282* (2016.01)
*H01M 8/0284* (2016.01)
*H01M 8/0286* (2016.01)
*H01M 8/0276* (2016.01)

(52) U.S. Cl.
CPC ....... *H01M 8/0273* (2013.01); *H01M 8/0276* (2013.01); *H01M 8/0278* (2013.01); *H01M 8/0282* (2013.01); *H01M 8/0284* (2013.01); *H01M 8/0286* (2013.01)

(58) Field of Classification Search
CPC ............. H01M 8/0273; H01M 8/0278; H01M 8/0276; H01M 8/0286; H01M 8/0284; H01M 8/0282; H01M 8/0242; H01M 8/028; Y02E 60/50
See application file for complete search history.

(56) References Cited

U.S. PATENT DOCUMENTS

| | | | |
|---|---|---|---|
| 2002/0106954 A1 | 8/2002 | Sakumoto | |
| 2003/0072988 A1* | 4/2003 | Frisch | H01M 8/0247 429/469 |
| 2013/0052565 A1* | 2/2013 | Ridgeway | H01M 8/0213 429/516 |
| 2015/0349355 A1 | 12/2015 | Goto et al. | |

FOREIGN PATENT DOCUMENTS

| | | |
|---|---|---|
| EP | 1 503 441 A2 | 2/2005 |
| JP | 2001-349436 A | 12/2001 |
| JP | 2005-285537 A | 10/2005 |
| JP | 2011-238364 A | 11/2011 |
| JP | 2013-175336 A | 9/2013 |
| KR | 10-0400434 B1 | 9/2003 |
| KR | 2009-0006973 A | 1/2009 |
| WO | WO 2007/022464 A2 | 2/2007 |

* cited by examiner

*Primary Examiner* — Eugenia Wang
(74) *Attorney, Agent, or Firm* — Morgan, Lewis & Bockius LLP

(57) ABSTRACT

A frame gasket may include a flat base, which is positioned along the edge of stack constitutional parts and which includes a first elastic base and reinforced fibers mixed therein to ensure sealing of a fuel cell stack, and first projection units, which project over the base and which include a second elastic base.

14 Claims, 7 Drawing Sheets

FRAME GASKET FOR FUEL CELL AND METHOD OF MOLDING THE SAME

CROSS REFERENCE TO RELATED APPLICATION

The present application claims priority to Korean Patent Application No. 10-2016-0060449, filed May 17, 2016, the entire content of which is incorporated herein for all purposes by this reference.

BACKGROUND OF THE INVENTION

Field of the Invention

The present invention relates to a self-standing frame gasket for a fuel cell, which enables an elastomer to have sufficient rigidity and improves sealing and durability even though an insert is not applied, and a method of molding the same.

Description of Related Art

A polymer electrolyte membrane fuel cell (PEMFC) is extensively applied as a fuel cell for vehicles. A gasket must be generally used for each cell in order to maintain a seal against hydrogen, which is a reaction gas, air, and coolant in a fuel cell stack for use in vehicles.

The gasket used in the stack for fuel cell vehicles must satisfy all of various requirements such as appropriate hardness, excellent elasticity, very low compression set, excellent mechanical properties, excellent acid/hydrolysis resistance, low diffusivity of hydrogen/air/coolant, low content of impurities causative of catalytic poisoning, excellent heat resistance, high electric insulation, excellent productivity, and low cost.

Typical elastomers that sufficiently satisfy the aforementioned requirements and are frequently used in gaskets for fuel cell stacks may be broadly classified into fluorine, silicone, and hydrocarbon-based elastomers.

The fluorine-based elastomer is broadly classified into FKM and FFKM, and has been extensively applied for various purposes, such as in the vehicle/construction/petrochemical industries, in recent years. Particularly, the fluorine-based elastomer has been considered to be usable over a long period of time under severe driving conditions of the fuel cell vehicle due to excellent elasticity, acid resistance, and heat resistance, thus receiving a lot of attention as the gasket for the fuel cell stack. However, there are drawbacks of poor injection moldability and cold resistance and high prices.

The silicone-based elastomer is broadly classified into a general silicone elastomer, such as polydimethylsiloxane, and reformed silicone, such as fluorinated silicone. In the case of the silicone-based elastomer, liquid-phase silicone rubber may be more frequently used than solid-phase silicone rubber during fine injection molding, thereby ensuring excellent injection moldability. However, there is a drawback in that a silicone impurity is eluted under the driving condition of the fuel cell, thus poisoning a platinum catalyst in the electrodes.

Further, an elastomer, such as an ethylene propylene diene monomer (EPDM), an ethylene propylene rubber (EPR), an isoprene rubber (IR), and an isobutylene-isoprene rubber (IIR), is frequently used as the hydrocarbon-based elastomer. Generally, the hydrocarbon-based elastomer has merits of excellent cold resistance and low prices, but has a drawback in that it is difficult to use the hydrocarbon-based elastomer over a long period of time because the physical properties are significantly reduced at a high temperature of 100° C. or higher.

Further, in the conventional technology, the gasket for the fuel cell may be integrated with a metal separator, a gas diffusion layer, a membrane electrode assembly, or a resin frame as an insert, or a polymer film may be layered on or attached to one side of the gasket so that the gasket, which has insufficient rigidity, is supported. As for the conventional technology, the necessity of a process for integrating the gasket and the insert, applied to each cell of the fuel cell stack including hundreds of cells layered thereon, and a process for using an additional film and attaching a film and a gasket, defects (deformation and surface contamination of the separator) during the integration process, and the cost of quality inspection after integration serve to increase the production cost and to reduce the productivity of the fuel cell stack.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a frame gasket for a fuel cell, which maintains its shape even when an insert is used by increasing the rigidity of the gasket including an elastomer, and a method of molding the same. Accordingly, an unnecessary process for applying an insert to a mold during injection molding of the gasket may be obviated, and the sealing, durability, productivity, and marketability of the fuel cell may be improved.

To accomplish the above object, various aspects of the present invention are directed to providing a frame gasket for a fuel cell, the frame gasket including a base, which is positioned along an edge of a separator, a membrane electrode assembly, or an end plate to extend from an edge of the separator, the membrane electrode assembly, or the end plate to a predetermined width and height, and which includes a first elastic base and reinforced fibers mixed therein to ensure sealing of a fuel cell stack, and first projection units, which extend from an upper end of the base to project over the base and which include an elastomer.

The first projection units may extend from the upper end of the base, and the base and the first projection units may extend along the edge of the separator, the membrane electrode assembly, or the end plate to form a closed loop.

The first projection units may include a material including a second elastic base.

The first elastic base may be the same as the second elastic base, and the base and the first projection units may be integrally molded.

The first projection units may include a material including a second elastic base and the reinforced fibers mixed therein, and the content of the reinforced fibers may be lower in the first projection units than in the base.

The base may include 10 to 30 phr (parts per hundred rubber) of the reinforced fibers based on 100 phr of a content of the first elastic base.

The first elastic base may include at least one of an ethylene propylene diene monomer (EPDM), fluorine and silicone-based rubbers.

The first projection units may include a material including a second elastic base, and the second elastic base may have a hardness that is lower than the hardness of the first elastic base.

The reinforced fibers may include at least one of carbon fibers, glass fibers, and aramid fibers.

The width of the first projection units may be smaller than the fiber length of the reinforced fibers.

The first projection units may include a material including a second elastic base, and second projection units including the second elastic base may be further provided on the first projection units.

The width of the second projection units may be smaller than the fiber length of reinforced fibers, and the width of the first projection units may be larger than the fiber length of the reinforced fibers.

A plurality of first projection units may be provided on the upper end of the base to be spaced apart from each other, and the plurality of first projection units may form a closed loop on an upper side of the base.

The plurality of first projection units may extend from an upper side of the base so that the arrangement lines of the first projection units are inclined at different angles.

The plurality of first projection units may extend so that arrangement lines of the first projection units are parallel to each other in a zigzag arrangement or cross each other on the upper end of the base.

The plurality of first projection units may be provided to be spaced apart from each other on either of the upper end and a lower end of the base, and the plurality of first projection units may form a closed loop on either of the upper and lower sides of the base.

The base may be positioned between an anode separator and a cathode separator along an edge of a cooling surface on which the anode and the cathode separators of the fuel cell are formed to face each other.

The base may be positioned on either side of upper and lower sides of the membrane electrode assembly along the edge of the membrane electrode assembly to come into contact with the separator and the membrane electrode assembly on respective sides thereof.

The base may be positioned along the edge of an end cell heater of the fuel cell stack, and may come into contact with the end cell heater at one side thereof and with the end plate of the fuel cell at a remaining side thereof.

To accomplish the above object, the present invention also provides a method of molding a frame gasket for a fuel cell. The method includes molding a base using a material including a first elastic base and reinforced fibers mixed therein, and molding first projection units using a material, including a second elastic base, on an upper end of the base.

The merits of a frame gasket for a fuel cell according to an exemplary embodiment of the present invention are as follows.

First, an elastomer may be directly molded without the application of an insert (separator/gas diffusion layer/membrane electrode assembly/resin frame) to a mold, and reinforced fibers may be provided to reinforce the mechanical rigidity of a flat elastomer base, thus improving the ability of the gasket to maintain its shape.

Second, an insert, along with unnecessary processes, including a process of integrating the gasket and the insert, post-treatment of integrated molded products, and washing of the insert, may be obviated, reducing processing costs and ensuring production cost savings.

Third, since the process of integrating with the insert is unnecessary, deformation or surface contamination of the separator during molding of the gasket may be fundamentally prevented, and the defect ratio of molding and the amounts of materials that are used may be reduced to thus ensure a cost savings effect.

Fourth, an adhesive must be applied on the surface of the insert to maintain the shape of the gasket and to dispose the gasket at a desired position during the process of integrating the gasket, having poor rigidity, and the insert in the related art. However, in an exemplary embodiment of the present invention, a costly adhesive is unnecessary and the adhesive application process is not required, thus ensuring a reduction of material and processing costs.

Fifth, the structural stability of the gasket may be improved using the flat elastomer base having high rigidity. The tolerance of other parts in the fuel cell may be accommodated and sealing of the fuel cell may be improved due to projection units formed on the base.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
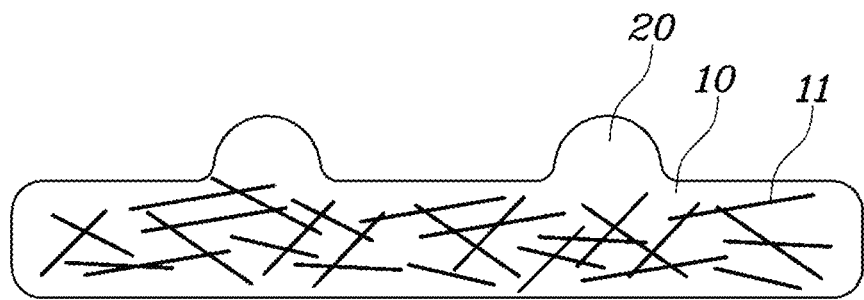
FIG. 1, FIG. 2, FIG. 3, and FIG. 4 are schematic views showing the section of a frame gasket for a fuel cell according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIG. 1, a frame gasket for a fuel cell according to an exemplary embodiment of the present invention includes a flat elastic base 10, which is positioned along an edge of a separator, a membrane electrode assembly, or an end plate to ensure sealing of the fuel cell, and which includes a first elastic base and reinforced fibers mixed therein, and a first projection unit 20, which projects over the base 10 and which includes an elastomer.

Figure 5:
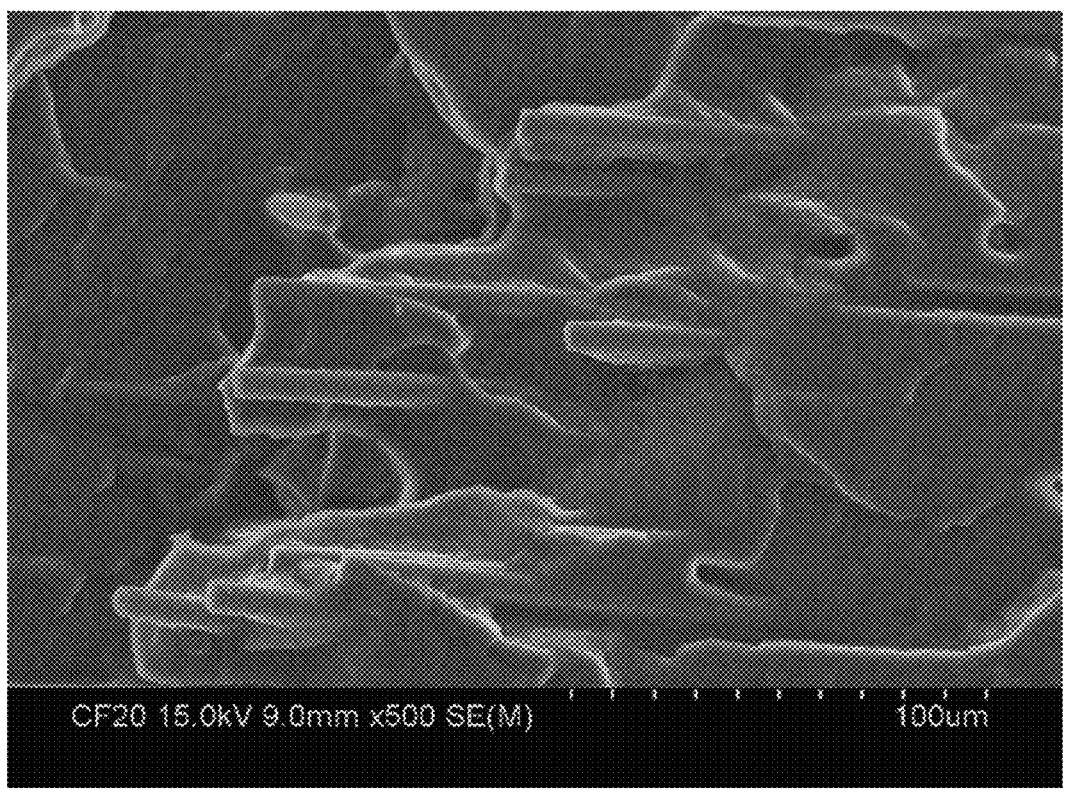
FIG. 5 is an SEM image showing the fracture surface of the frame gasket for the fuel cell according to the embodiment of the present invention.

Various embodiments of various embodiments of the present invention relates to the frame gasket for sealing the parts of the fuel cell. The base 10 and the projection unit constituting the gasket may basically include elastomers. Examples used for the gasket are fluorine rubber (FKM), silicone rubber (VMQ), and isoprene rubber (IR). As shown in FIG. 5, the present invention suggests EPDM rubber mixed with carbon fibers as a preferable embodiment, and this is because the EPDM rubber is inexpensive and may have excellent cold resistance and chemical resistance compared to other elastomers.

Meanwhile, a first elastic base is provided as the elastomer constituting the base 10 according to an exemplary embodiment of the present invention, and a second elastic base is provided as the elastomer constituting the projection unit. For convenience of manufacture, the base 10 and the projection unit may be formed using a same elastomer. Since the same elastomer is used, the base 10 and the projection unit may be molded through a single step, and the material combination may be high even when the base and the projection unit are molded through two steps. In addition, even though the first and the second elastic bases are the same and molding is performed through a single step, the reinforced fibers are mixed only with the first elastic base constituting the base 10, or the amount of the reinforced fibers mixed with the first elastic base is larger than that of the reinforced fibers mixed with the second elastic base. Accordingly, a self-standing frame gasket for a fuel cell, which is the target of the present invention, can be sufficiently embodied.

On the other hand, when the first elastic base and the second elastic base are different, it is preferable that the second elastic base, constituting the first projection unit 20 or a second projection unit 30, as will be described later, have hardness which is lower than that of the first elastic base. The hardness of the base 10 is increased to disturb pressing of the base due to the reinforced fibers, which are provided to improve the structural stability of the gasket. However, as shown in FIGS. 1 to 4, the first projection unit 20 and the second projection unit 30 do not have flat surfaces, and the first projection unit 20 and the second projection unit 30 include the elastomer having low hardness, so that the first projection unit and the second projection unit come into contact with parts constituting the stack to ensure sealing, thereby minimizing the pressing force (clamping force) required during assembly of the cells. Accordingly, in an exemplary embodiment of the present invention, the hardness of the second elastic base is set to be lower than that of the first elastic base, thus ensuring sufficient sealing of the frame gasket for the fuel cell. Moreover, the tolerance during assembly with other parts (gas diffusion layer, membrane electrode assembly, or the like) constituting the stack may be absorbed by the first projection unit 20 or the second projection unit 30, which have low hardness, to thus improve the electrochemical performance uniformity of each part constituting the fuel cell.

However, even though the hardness of the first elastic base is higher than that of the second elastic base, the first elastic base has a predetermined elasticity. Accordingly, since the gasket may be slightly bent due to the elasticity, the insert is added to a mold during molding of the gasket. However, in an exemplary embodiment of the present invention, the base 10 of the gasket does not include only the first elastic base, but includes the first elastic base and the reinforced fibers mixed therein to thus increase the rigidity of the base 10, thereby overcoming the aforementioned problem.

Examples of the reinforced fibers mixed with the first elastic base may include various types, but the present invention suggests carbon fibers, glass fibers, and aramid fibers as reinforced fibers useful for increasing the rigidity of the base 10 of the gasket. However, the first elastic base includes a hydrocarbon-based EPDM rubber in the aforementioned preferable embodiment. Therefore, among the reinforced fibers, when the carbon fibers consisting mainly of carbon are used, the EPDM of the base 10 and the carbon fibers may be easily mixed without an additional process for surface-treating the carbon fibers because the EPDM and the carbon fibers are both carbon-based materials. Accordingly, it is most preferable to use the carbon fibers in terms of costs and the manufacturing process.

As shown in FIG. 1, in the frame gasket for the fuel cell according to an exemplary embodiment of the present invention, the width of the first projection unit 20 is smaller than the fiber length of the reinforced fibers A 11 regardless of the type of reinforced fibers that are used. The reason for this is that the frame gasket for the fuel cell according to an exemplary embodiment of the present invention is manufactured using injection or compression molding of the material, including the first elastic base and the reinforced fibers mixed therein, in the mold. That is, the reinforced fibers are partially oriented according to the flow of the base during molding in the mold, but when the fiber length of the reinforced fibers A 11 is smaller than the width of the first projection unit 20, the material, including the first elastic base and the reinforced fibers A 11 mixed therein, may excessively flow into the first projection unit 20 regardless of a designer's intention. Accordingly, to prevent such excess flow, the width of the first projection unit 20 is set to be smaller than the fiber length of the reinforced fibers A 11. The fiber length of the reinforced fibers A 11 may depend on the type of fibers, but the glass, aramid, and carbon fibers, which are suggested as representative examples in an exemplary embodiment of the present invention, are 4 mm, 5 mm, and 3 or 6 mm in length, respectively. The width of the first projection may depend on the type of reinforced fibers that are used.

Figure 2:
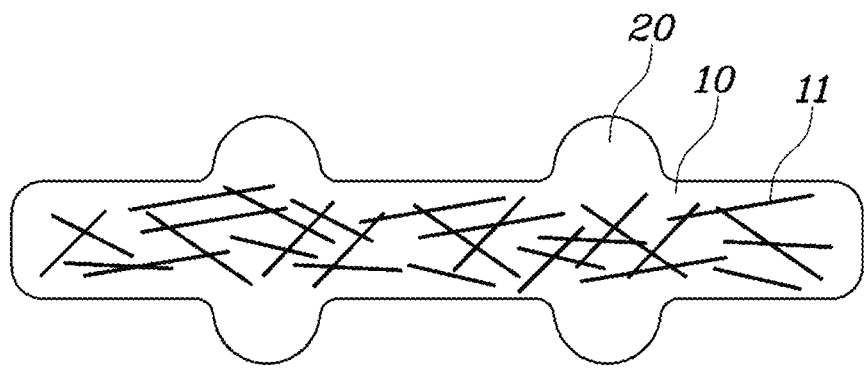

Portions of the constitution of FIG. 2 are the same as those of FIG. 1, and the first projection units 20 are positioned on either side of the base 10 to face each other. Accordingly, the sealing of the fuel cell may be improved compared to FIG. 1.

Figure 3:
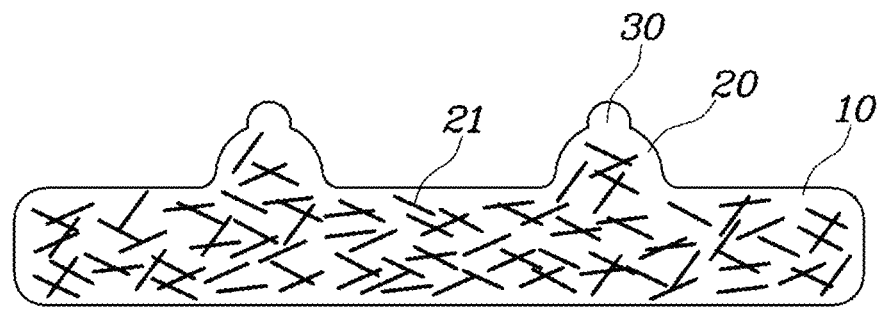

Portions of the constitution of FIG. 3 are the same as those of FIG. 1, and the second projection unit 30 including the second elastic base is further provided on the first projection unit 20. That is, the first projection unit 20 and the second projection unit 30 form the projection units. The width of the second projection unit 30 is smaller than the fiber length of reinforced fibers B 21, and the width of the first projection unit 20 is larger than the fiber length of the reinforced fibers B 21.

Therefore, in FIG. 3, the reinforced fibers B 21 may move into the first projection unit 20 to increase the rigidity of the gasket. However, since the first projection unit has the same rigidity as the base 10, the second projection unit 30 needs to be further provided in order to maintain the seal at the same level or higher.

Figure 4:
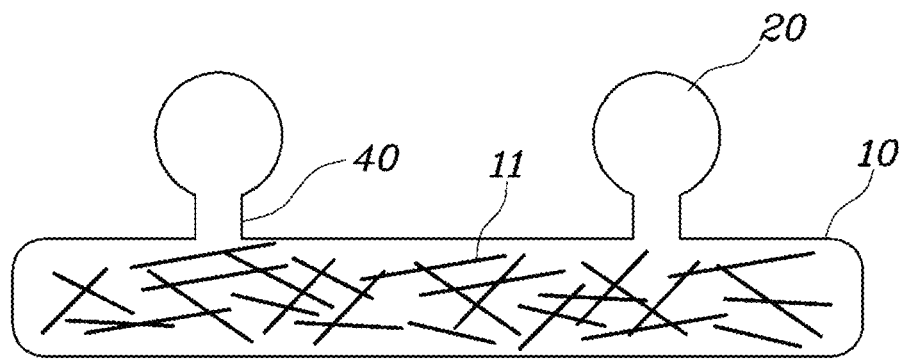

Further, the projection unit may be provided in the manner of FIG. 4, and a recess unit 40 may be formed between the base 10 and the first projection unit 20 to prevent the reinforced fibers A 11 from moving into the first projection unit 20. In this case, the width of the recess unit 40 is smaller than the width of the first projection unit 20 and is smaller than the fiber length of the reinforced fibers A 11, thereby preventing the reinforced fibers A 11 from excessively moving into the first projection unit 20.

The molding type of the gasket may be selected by a designer among the constitutions of FIGS. 1 to 4, depending on the type of the reinforced fibers used in the frame gasket for the fuel cell and the type of contact with each constitutional part of the cell.

Figure 6:
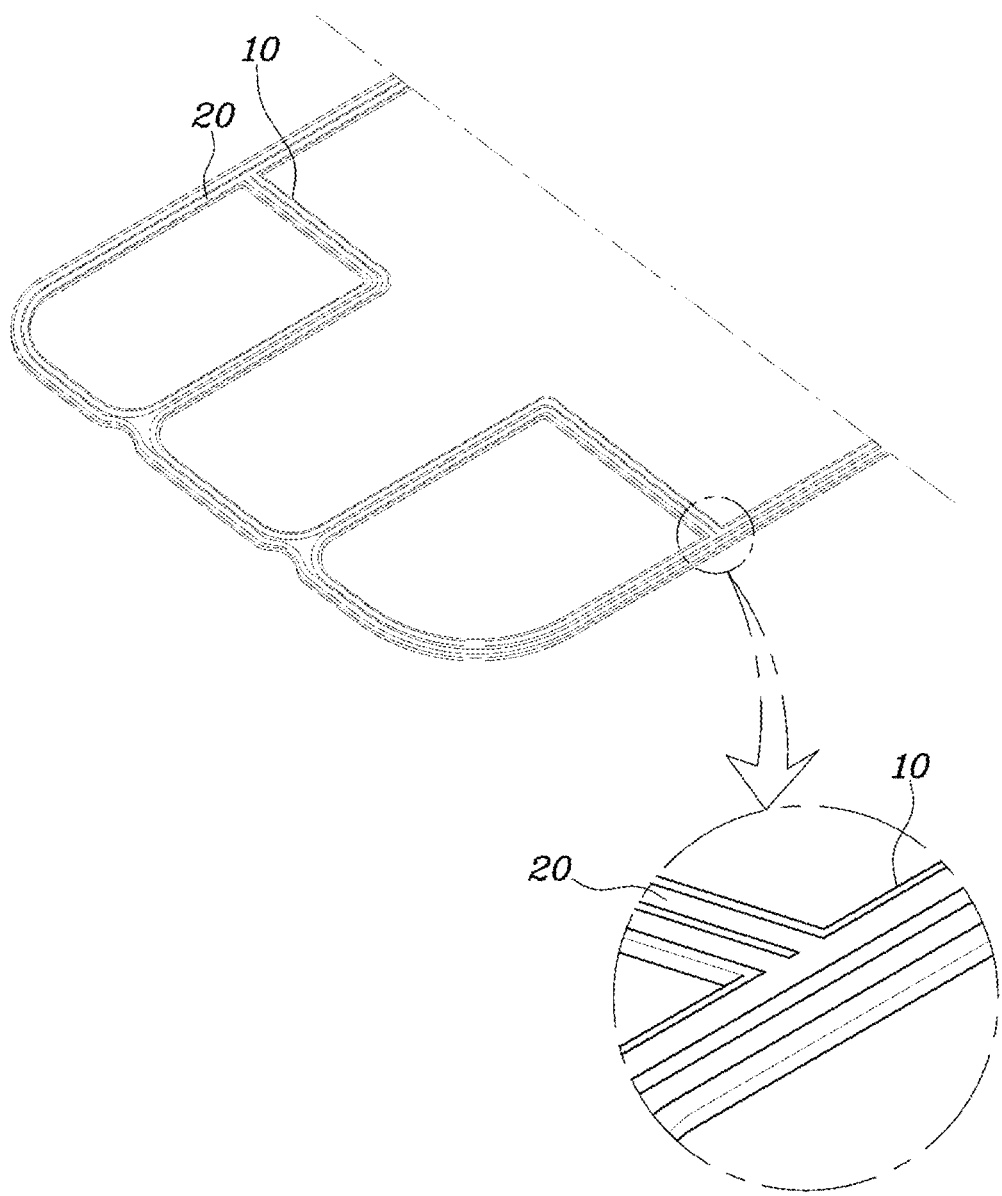
FIG. 6, FIG. 7, and FIG. 8 are schematic plane views of the frame gasket for the fuel cell according to the embodiment of the present invention.

A plurality of first projection units 20 may be formed on the base 10, regardless of the type of the constitutions of FIGS. 1 to 4. Specifically, as shown in FIG. 6, the plurality of first projection units 20 may be formed at predetermined standard intervals on one side of the base 10 to be spaced apart from each other and to form a closed loop. Needless to say, to ensure that the entire base is sealed, the first projection units 20 are formed on the entire base 10 to form a closed loop. However, in some cases, the first projection units 20 may extend from a portion of the base 10, which is positioned on a manifold, forming a closed loop surrounding the manifold. In an exemplary embodiment of the present invention, the sealing of the fuel cell may be improved using the plurality of projection units.

Figure 7:
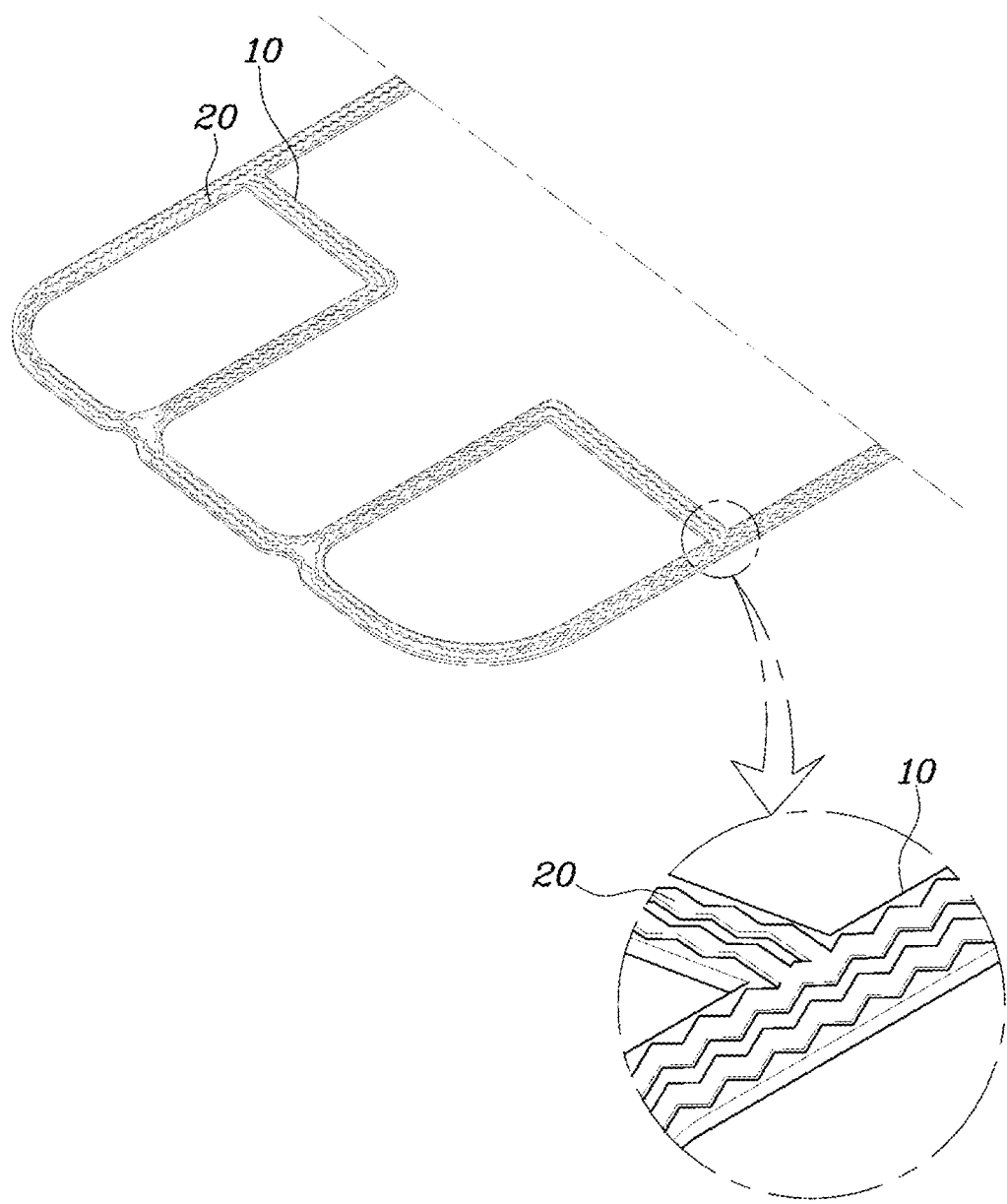
Figure 8:
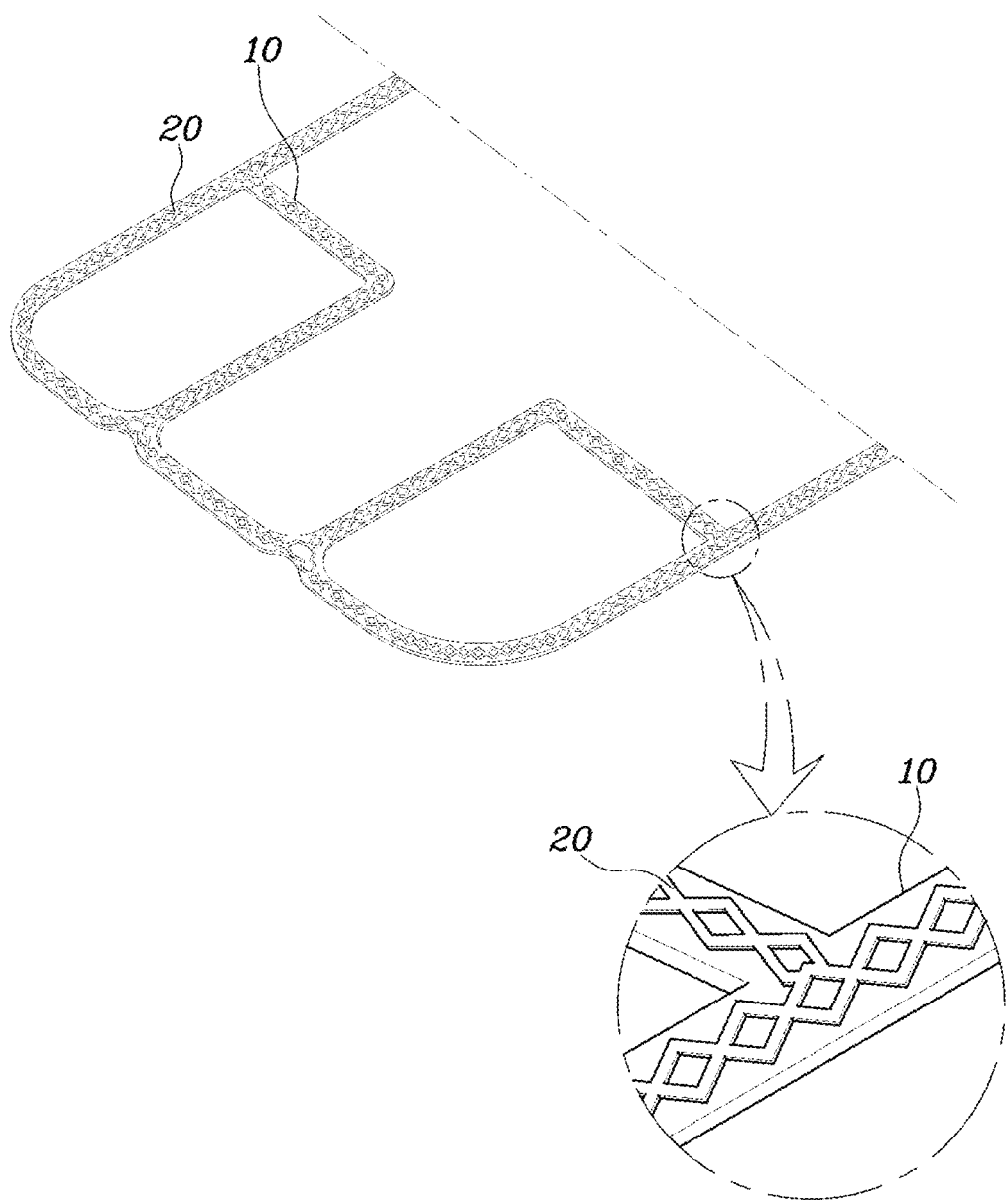

Moreover, in an exemplary embodiment of the present invention, as shown in FIG. 7, the plurality of first projection units 20 may not be positioned in a line, but may be positioned in a zigzag arrangement with a predetermined zigzag angle. Alternatively, as shown in FIG. 8, the plurality of first projection units 20 may be positioned to cross each other and form a closed loop. For example, the first projection units 20 may be positioned in a zigzag arrangement with different zigzag angles to form a closed loop. The reason why the zigzag angles of the first projection units 20 are different from each other is that since the resistance to the flow of material, including the first elastic base and the reinforced fibers A 11 mixed therein, is increased during molding of the gasket, the possibility that the material, including the first elastic base and the reinforced fibers A 11 mixed therein, will move into the first projection unit 20 is reduced compared to the straight-line arrangement of the first projection units 20. In addition, when the base 10 and the first projection units 20 are molded simultaneously through a single step, the content of the reinforced fibers A 11 may be higher in the base 10 than in the first projection units due to the zigzag arrangement.

Figure 9:
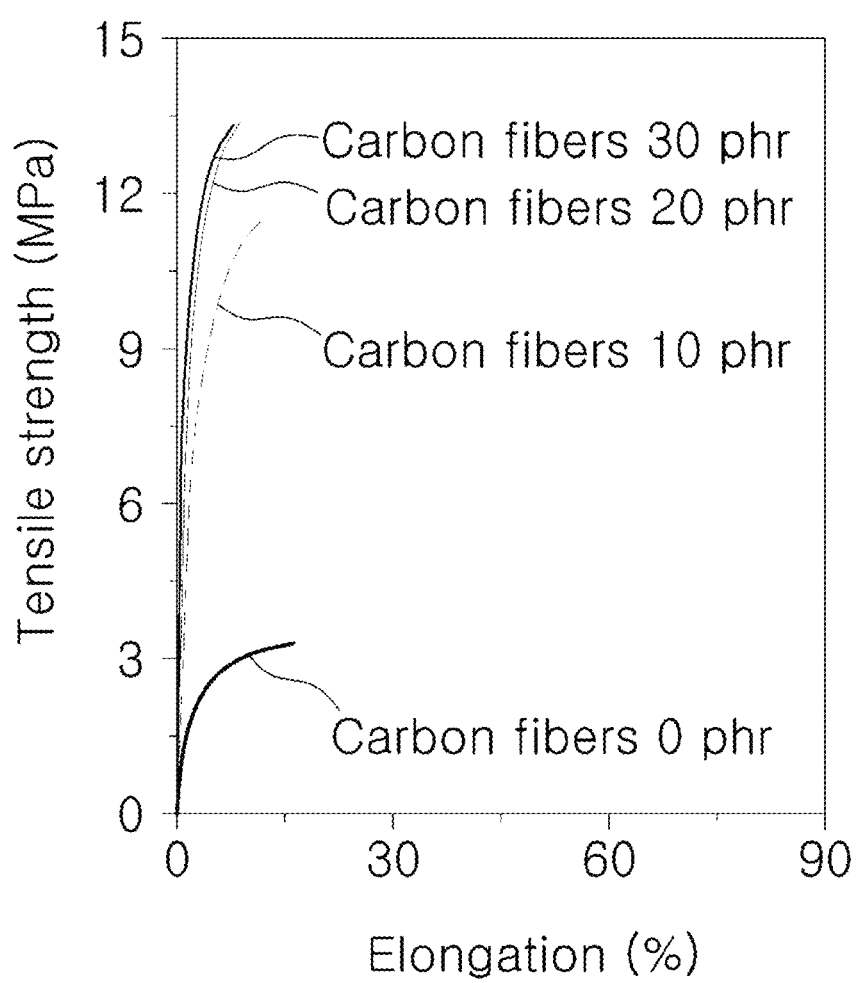
FIG. 9 is a graph showing an increase in rigidity for each content of the reinforced fibers in the frame gasket for the fuel cell according to the embodiment of the present invention.

From the graph of FIG. 9, it can be confirmed that the rigidity of the gasket for the fuel cell, which is manufactured to have the aforementioned structure, is increased compared to that of a conventional gasket. FIG. 9 is a graph showing tensile strength as a function of an elongation in the case where the first elastic base of the base 10 of the gasket includes the EPDM rubber and the carbon fibers which are added as the reinforced fibers. From FIG. 9, it can be confirmed that when the carbon fibers are mixed in a content of 10 to 30 phr, the rigidity of the frame gasket for the fuel cell is increased compared to the case where the carbon fibers are not included. Meanwhile, it can be seen that when the content of the carbon fibers is 40 phr or more, mixing of the carbon fibers with the EPDM rubber becomes poor, thus reducing molding processability. Therefore, it is preferable for the carbon fibers to be mixed in a content of approximately 10 to 30 phr in terms of mixing of the carbon fibers with the EPDM rubber, an increase in rigidity, the cost of products, and insulation resistance, as will be described later.

Figure 10:
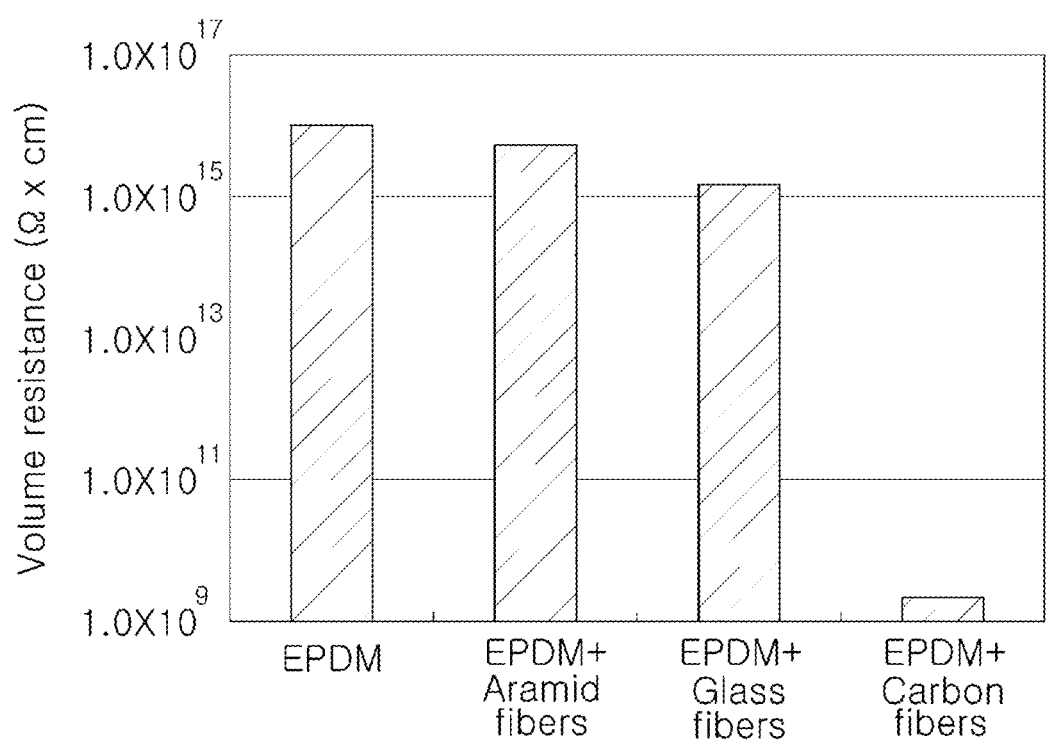
FIG. 10 is a graph showing a change in volume resistance, depending on the type of reinforced fibers in the frame gasket for the fuel cell according to the embodiment of the present invention.

FIG. 10 is a graph obtained by measuring the volume resistance of the gasket sample to confirm the electric insulation of the gasket for the fuel cell according to an exemplary embodiment of the present invention (Before the description of FIG. 10, it is noted that the conventional technology described in the graph of FIG. 10 means the volume resistance of the gasket for the fuel cell, manufactured in advance by the present applicant, but does not mean a known technology). Unlike the gasket used in other apparatuses, the gasket for use in the fuel cell comes into direct contact with the membrane electrode assembly and the separator, which generate electricity and through which electric current flows, and accordingly, electric insulation is considered as a very important factor. When the gasket is manufactured, the volume resistance relative to electric insulation is very important. From the graph of FIG. 10, it can be confirmed that when the aramid fibers or the glass fibers are mixed with EPDM, since the volume resistance is not largely reduced compared to the conventional technology, the electric insulation of the gasket is insignificantly reduced, when the reinforced fibers are mixed.

When the carbon fibers are mixed, the volume resistance is reduced, unlike the gasket for the fuel cell which has been conventionally used by the present applicant. However, since the volume resistance is $1 \times 10^9$ [Ω·cm] or more until the content of the reinforced fibers approaches 30 phr, there is no problem in terms of electric insulation. Accordingly, the aforementioned reduction of the volume resistance is not considered as a side effect. When carbon fibers that mix well with (i.e., are compatible with) EPDM are used, there is a merit in terms of a manufacturing process. Accordingly, it is preferable to mix EPDM and the carbon fibers though the volume resistance is reduced to a certain extent.

The base of the frame gasket for fuel cells according to an exemplary embodiment of the present invention is positioned along an edge of the separator, the membrane electrode assembly, or the end plate. Specifically, the base may be positioned along the edge of a cooling surface, on which the anode separator and the cathode separator are formed to face each other, may be positioned along the edges of both sides of the membrane electrode assembly so as to come into contact with the separator at one side thereof and with the membrane electrode assembly at the other side thereof, or may be positioned along the edge of an end cell heater constituting the stack to come into contact with the end cell heater at one side thereof and with the end plate at the other side thereof.

Further, a method of molding the frame gasket for the fuel cell according to an exemplary embodiment of the present invention may include injection or compression molding the base 10 and the first projection units 20 or the second projection units 30 through a single step using the mold of the frame gasket for the fuel cell according to an exemplary embodiment of the present invention.

However, even if the width of the first projection unit 20 is controlled or the first projection unit 20 is positioned in the way suggested by the present invention, a portion of the reinforced fibers (reinforced fibers A 11 or reinforced fibers B 21) may move into the first projection unit 20 or the second projection unit 30. In addition, when the reinforced fibers move into the projection unit, the sealing strength of the fuel cell may be reduced.

Therefore, the present invention suggests double injection or compression molding processes to overcome the aforementioned disadvantage. Specifically, the method may include a primary molding step of molding the base 10 using the material including the first elastic base and the reinforced fibers mixed therein, and a secondary molding step of molding the first projection units 20 on the base 10 using the second elastic base.

As for the aforementioned frame gasket for the fuel cell, the base 10 and the first projection units 20 are molded using different molding processes. Accordingly, the projection units may not be disposed in a complicated arrangement such as a zigzag arrangement, and the material and the hardness of the projection unit may be made different from those of the base 10, thereby more easily accomplishing the object of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A frame gasket for a fuel cell, comprising:
   a base, which is positioned along an edge of a separator, a membrane electrode assembly, or an end plate to extend from the edge of the separator, the membrane electrode assembly, or the end plate to a predetermined width and height, and which includes a first elastic base and reinforced fibers mixed therein to ensure sealing of a fuel cell stack; and
   a plurality of first projection units, which extend from an upper end of the base to project over the base and which include an elastomer,
   wherein a width of the plurality of the first projection units is smaller than a fiber length of the reinforced fibers to prevent the reinforcing fibers from being mixed into the first projection units during manufacturing using injection or compression molding.

2. The frame gasket of claim 1, wherein the plurality of the first projection units extend from the upper end of the base, and the base and the plurality of the first projection units extend along the edge of the separator, the membrane electrode assembly, or the end plate to form a closed loop.

3. The frame gasket of claim 1, wherein the plurality of the first projection units include a material including a second elastic base.

4. The frame gasket of claim 3, wherein the first elastic base is a same as the second elastic base, and the base and the plurality of the first projection units are integrally molded.

5. The frame gasket of claim 1, wherein the plurality of the first projection units include a material including a second elastic base and the reinforced fibers mixed therein, and a content of the reinforced fibers is lower in the plurality of the first projection units than in the base.

6. The frame gasket of claim 1, wherein the base includes 10 to 30 parts per hundred rubber (phr) of the reinforced fibers based on 100 phr of a content of the first elastic base.

7. The frame gasket of claim 1, wherein the first elastic base includes at least one of an ethylene propylene diene monomer (EPDM), fluorine and silicone-based rubbers.

8. The frame gasket of claim 1, wherein the plurality of the first projection units include a material including a second elastic base, and the second elastic base has a hardness that is lower than a hardness of the first elastic base.

9. The frame gasket of claim 1, wherein the reinforced fibers include at least one of carbon fibers, glass fibers, and aramid fibers.

10. The frame gasket of claim 1, wherein the plurality of the first projection units is provided on the upper end of the base to be spaced apart from each other, and the plurality of the first projection units form a closed loop on an upper side of the base.

11. The frame gasket of claim 10, wherein the plurality of the first projection units extend from an upper side of the base so that arrangement lines of the plurality of the first projection units are inclined at different angles.

12. The frame gasket of claim 10, wherein the plurality of the first projection units extend so that arrangement lines of the plurality of the first projection units are parallel to each other in a zigzag arrangement or cross each other on the upper end of the base.

13. The frame gasket of claim 1, wherein the plurality of the first projection units is provided to be spaced apart from each other on either of the upper end and a lower end of the base, and the plurality of the first projection units forms a closed loop on either of upper and lower sides of the base.

14. A method of molding the frame gasket for the fuel cell of claim 1, the method comprising:
   molding the base using a material including the first elastic base and the reinforced fibers mixed therein; and
   molding a plurality of the first projection units using a material, including a second elastic base, on the upper end of the base.

* * * * *